United States Patent [19]
Frankenberger, Jr. et al.

[11] Patent Number: 6,077,429
[45] Date of Patent: Jun. 20, 2000

[54] BACTERIAL REMOVAL OF PERCHLORATE AND NITRATE

[75] Inventors: William T. Frankenberger, Jr., Riverside; David Herman, Grand Terrace, both of Calif.

[73] Assignee: The Reagents of the University of California, Oakland, Calif.

[21] Appl. No.: 09/172,888

[22] Filed: Oct. 15, 1998

[51] Int. Cl.$^7$ .................................................... C02F 3/34
[52] U.S. Cl. .......................... 210/605; 210/611; 210/757; 435/262.5; 435/264; 435/822
[58] Field of Search .................... 210/605, 606, 210/757, 610, 611; 435/262, 262.5, 822, 264

[56] References Cited

U.S. PATENT DOCUMENTS

| | | | |
|---|---|---|---|
| 3,755,156 | 8/1973 | Yakolev et al. | 210/5 |
| 3,943,055 | 3/1976 | Korenkov et al. | 210/2 |
| 4,756,832 | 7/1988 | Gold et al. | 210/632 |
| 5,302,285 | 4/1994 | Attaway et al. | 210/605 |
| 5,382,265 | 1/1995 | Mower | 23/302 R |
| 5,891,339 | 4/1999 | Van Ginkel et al. | 210/605 |
| 5,948,260 | 9/1999 | Attaway, III et al. | 210/603 |

OTHER PUBLICATIONS

Herman, D.C. et al., "Microbial-Mediated Reduction of Perchlorate in Groundwater," *Journal of Environmental Quality,* vol. 27, No. 4, pp. 750–754, 1998.
Rikken, G.B. et al., "Transformation of (per)chlorate into chloride by a newly isolated bacterium: reduction and dismutation," *Appl. Microbiol. Biotechnol.,* 45:420–426, 1996.
Wallace, W. et al., "Perchlorate reduction by a mixed culture in an up–flow anaerobic fixed bed reactor," *Journal of Industrial Microbiology & Biotechnology,* 20:126–131, 1998.
Malmqvist, A. et al., "Biological Removal of Chlorate From Bleaching Plant Effluent," *Wat. Sci. Tech,* vol. 29, No. 5, pp. 365–372, 1994.
Stepanyuk, V.V. et al., New Species of the Acinetobacter Genus–Acinetobacter thermotoleranticus sp. Nov., *Microbiologiya,* 61:347–356, 1992.
Malmqvist, A. et al., "Ideonella dechloratans gen. nov., sp. nov., a New Bacterium Capable of Growing Anaerobically with Chlorate as an Electron Acceptor," *System Appl. Microbiol.* 17:58–64, 1994.
Attaway, H. et al., "Reduction of perchlorate by an anaerobic enrichment culture," *Journal of Industial Microbiology,* 12:408–412, 1993.
Wallace, W., et al., "Identification of an anaerobic bacterium which reduces perchlorate and chlorate as *Wolinella succinogens,*" *Journal of Industrial Microbiology,* 16:68–72, 1996.
van Ginkel, C.G., et al., "Reduction of Chlorate with Various Energy Substrates and Inocula Under Anaerobic Conditions," *Chemosphere,* vol. 31, No. 9, pp. 4057–4066, 1995.
Malmqvist, A. et al., "Anaerobic Growth of Microorganisms with Chlorate as an Electron Acceptor," *Applied and Environmental Microbiology,* vol. 57, No. 8, p. 2229–2232, 1991.
Wallace, W., et al., Abstract: "Purification of the Chlorite Reductase from *Wolinella succinogenes* HAP–1," 95th ASM General Meeting, Tuesday, Session 148.
van Ginkel, C.G., "Purification and characterization of chlorite dismutase: a novel oxygen–generating enzyme," *Arch. Microbiol.,* 166–321–326, 1996.

*Primary Examiner*—David A. Simmons
*Assistant Examiner*—Chester T. Barry
*Attorney, Agent, or Firm*—Oppenheimer Wolff & Donnelly LLP

[57] ABSTRACT

Methods and compositions for removing perchlorate and/or nitrate from contaminated material utilizing perc1ace bacteria under anaerobic conditions. Perc1ace is a gram-negative, curved rod, facultative anaerobe which is deposited with the American Type Culture Collection under ATCC No. 202172. Perc1ace may be used as a substitute for anaerobic bacteria which are presently being used in biological systems for removing perchlorate and/or nitrate from water and other contaminated materials, such as soil.

18 Claims, 3 Drawing Sheets

BACTERIAL REMOVAL OF PERCHLORATE AND NITRATE

BACKGROUND OF THE INVENTION

1. Field of the Invention

The present invention relates generally to methods for removing contaminants from water and soil. More particularly, the present invention involves the treatment of groundwater and/or soil with bacteria under anaerobic conditions to remove perchlorates and/or nitrates.

2. Description of Related Art

The publications, patents and other reference materials referred to herein to describe the background of the invention and to provide additional detail regarding its practice are hereby incorporated by reference. For convenience, the reference materials are numerically referenced and grouped in the appended bibliography.

Perchlorate ($ClO_4$) is an oxyanion that has been used extensively in the chemical and aerospace industries because it can act as a strong oxidizing agent. Ammonium perchlorate has been used in solid rocket fuel, explosives and pyrotechnics. The mishandling of perchlorate at aerospace-related industrial sites is the likely source of perchlorate that has recently been discovered in surface and ground waters. The evident persistence of perchlorate in the environment and its toxicity to humans at sufficient concentrations has raised concern over drinking water quality standards and possible environmental impacts. Perchlorate is not currently regulated under the Safe Drinking Water Act, although the California Department of Health Services has established an action level of 18 $\mu$g $L^{-1}$ based on an evaluation of toxicity data by the Environmental Protection Agency. Perchlorate has been found in certain drinking water wells in California and Nevada at concentrations that exceed this action level. In response, the California Department of Health Services has advised that water from these wells should not be used as a source of drinking water.

The development of effective and efficient strategies for the remediation of the perchlorate found in groundwater is an area of intense interest (7). Remediation strategies for the removal of perchlorate based on adsorption by activated carbon have not proven to be highly efficient due to rapid saturation of perchlorate adsorption sites. Other advanced procedures for the removal of perchlorate include reverse osmosis and ion exchange. However, these purification processes are very expensive. In addition, the preceding systems are limited due to the fact that once the perchlorate has been removed from groundwater a second disposal strategy is required to deal with the perchlorate that has been collected.

There also has been intense interest in utilizing microorganisms to remove perchlorate from water by biological processes. The degradation of perchlorate utilizing biological systems provides an attractive remediation strategy for a variety of reasons. For example, microorganisms which degrade perchlorate can completely transform perchlorate into an innocuous end-product, namely, chloride (1, 10, 13). Further, biological treatment can be used for the simultaneous treatment of perchlorate and nitrate. Nitrate pollution of groundwater can occur in agricultural regions, and the allowable concentration in potable water sources is strictly regulated. Finally, biological treatment processes can be quite cost effective when compared to the more expensive physical and chemical processes.

The transformation of oxyanions, such as perchlorate and chlorate, occurs in the absence of oxygen as the result of anaerobic respiration. Microbial respiration couples the oxidation of an organic substrate, such as glucose or acetate, to the reduction of a final electron acceptor, usually oxygen. Under anaerobic conditions, the oxidation of organic compounds requires the use of an alternative electron acceptor in place of oxygen, such as nitrate ($NO_3$), manganese (Mn[IV]), iron (Fe[III]), or sulfate ($SO_4$). Bacteria capable of anaerobic respiration are common to soil and sediment environments where anaerobic conditions are prevalent and natural sources of alternate electron acceptors are common. As a highly oxidized compound (+7 oxidation state), perchlorate has a high potential for utilization as an alternate electron acceptor. Perchlorate-reducing bacteria which have been described in scientific literature include *Vibrio dechloraticus Cuznesove* B-1168 (8, 14), *Wolinella succinogenes* HAP-1 (21), and a proteobacteria (strain GR-1) described by Rikken et al. (13). Bacteria capable of reducing chlorate are also known. Examples include *Ideonella dechloratans* (11) and an Acinetobacter sp. (16).

The proposed pathway of anaerobic perchlorate reduction is as follows (13).

$$ClO_4^- \dashrightarrow ClO_3^- \dashrightarrow ClO_2^- \dashrightarrow Cl^- + O_2$$
perchlorate    chlorate    chlorite    chloride Several patents have described microbial-mediated reduction of perchlorate as a means of removing perchlorate from industrial waste water (2, 8, 23). A United States patent issued to Yakovlev et al. (23) describes the use of unaerated sewage sludge for the treatment of certain oxygen-containing inorganic chlorine and metal compounds, including perchlorate, chlorate and chromate. Domestic sewage sludge is mixed with contaminated wastewater and placed in a large tank. In the absence of aeration, microbial utilization of organic material within the sludge will rapidly deplete the available oxygen. Under anaerobic conditions, the reduction of oxygen-containing inorganic compounds occurs with the oxidation of organic compounds. Following the anaerobic phase, a second stage in the process removes the sludge from the water by precipitation. It is important in this process to supply an excess quantity of organic material, as measured by biochemical oxygen demand (BOD), in order to ensure the creation of an anaerobic environment. The patent also states that the BOD must be greater than the amount of oxygen in the form of inorganic oxygen-containing contaminants present in the wastewater.

Several later patents have improved on the above basic process by enhancing the rate and extent of perchlorate reduction and enabling the treatment of higher concentration of perchlorate in the wastewater. Korenkov (8) described a method of reducing perchlorate and chlorate under anaerobic conditions utilizing the bacterium, *Vibrio dechloraticans Cuznesove* B-1168. This organism is capable of reducing perchlorate and chlorate when grown anaerobically on acetate or ethanol as a carbon source (14). The authors reported reduction rates of perchlorate as high as 70 mg $ClO_4^-$ per hour per gram biomass solids (dry weight), and the ability to treat perchlorate concentrations as high as 3 mM (about 300 mg $L^{-1}$).

Another United States patent (2) describes a process in which contaminated water is added to an anaerobic bioreactor and spiked with a mixed bacterial culture. The bacterial culture contains a specific bacterium, *Wolinella succinogenes*, which was isolated from domestic sewage sludge for its ability to reduce very high concentrations (>7000 mg/L) of perchlorate (1, 19, 21). High protein organic nutrients were found to support perchlorate reduction. The source of this oxidizable organic matter in the anaerobic bioreactor could be in the form of aged brewers yeast, cottonseed protein or whey powder. A second stage in the process removes nutrients and organic matter to improve the quality of the water for discharge. One advantage of this system is that it does not utilize sewage sludge, and therefore eliminates problems associated with the presence of pathogens. The bacterium isolated was capable of reducing perchlorate concentrations 26-fold greater than in previous reports, and was reported to have a specific perchlorate degradation rate of at least 1492 mg $ClO_4^-$ per hour per gram biomass (dry weight). Through the use of a specific isolate and by optimizing nutrient and environment conditions, the anaerobic reactor was capable of greater perchlorate reduction rates than previously reported.

Wallace et al. (19) described the use of an up-flow anaerobic fixed-bed reactor containing a consortium of facultative anaerobic microorganisms including *W. succinogenes* HAP-1. The 1.2 m (length)×7.6 cm (internal diameter) reactor could reduce 1500 mg per liter perchlorate to less than 100 mg per liter at a rate of 1 g perchlorate per hour per liter. Bioreactor systems have been optimized to treat high perchlorate concentrations (grams per L range), but there is currently little information about treating levels of perchlorate that are less than 1 mg per liter which can occur in subsurface water supplies. The primary objective of a groundwater treatment system is the removal of perchlorate to less than detectable levels.

The focus of the above research has been the remediation of perchlorate at the very high concentrations which are associated with wastewater generated in industrial situations, such as the manufacturing of solid rocket propellant. An additional problem which is of current concern is the presence of perchlorate at moderate to very low concentrations in subsurface water supplies used as a source of drinking water. To be an effective remediation strategy, biological transformation should ensure the reduction of perchlorate to concentrations less than the current action level of 18 mg $L^{-1}$, and preferably, to below the limit of detection.

Nitrate is another groundwater contaminant that is commonly found in ground waters of agricultural regions. The U.S. Environmental Protection Agency (EPA) has set a limit of 10 mg $NO_3^-$-N per liter for potable water. Nitrate reduction can occur under the same conditions as perchlorate reduction, and the treatment of nitrate contaminated water using anaerobic bioreactor systems is a well established technology (3, 4, 15). Commercialscale bioreactor systems in operation in Europe provide an efficient removal of nitrate and can operate at a high capacity, with some systems able to treat up to 400 $m^3$ per hour (5, 12). It would be desirable to apply similar technologies to the removal of perchlorate from groundwater. The simultaneous removal of perchlorate and nitrate within the same bioreactor would be a desirable feature of any groundwater treatment system.

As is apparent from the above, there is a present and continuing need to develop new processes and systems for removing perchlorate and nitrate from water.

SUMMARY OF THE INVENTION

In accordance with the present invention, a gram-negative, curved rod, facultative anaerobe has been isolated which is especially well-suited for use in the removal of perchlorate and/or nitrate from contaminated water and other materials. The bacteria was isolated from activated sewage sludge and has been given the name perc1ace.

The perc1ace bacteria is well suited for use in a wide variety of anaerobic bioreactors which are presently in use for removing contaminants from ground water. As a feature of the present invention, perc1ace may be substituted into any of the existing contaminant removal processes wherein a bacteria is utilized under anaerobic conditions to convert perchlorate to chloride. The perc1ace bacteria can be used in treating contaminated water wherein the initial perchlorate concentration is relatively low. In addition, the perc1ace bacteria is capable of reducing perchlorate levels to less than 0.005 mg per liter. In addition to biologically pure compositions of perc1ace bacteria, the present invention includes methods for using the perc1ace bacteria and the systems in which the bacteria is utilized.

The above discussed and many other features and attendant advantages of the present invention will become better understood by reference to the following detailed description when taken in conjunction with the accompanying drawings.

BRIEF DESCRIPTION OF THE DRAWINGS

FIG. 3A shows perchlorate and chloride in eluent when 100 mg per liter perchlorate was loaded into the column. FIG. 3B shows perchlorate and nitrate in the eluent when 0.130 mg per liter perchlorate was loaded into the column. The first arrow indicated the point at which 125 mg per liter nitrate was added to the influent. The level of nitrate was then reduced to 20 mg per liter (second arrow).

DETAILED DESCRIPTION OF THE INVENTION

Figure 1:
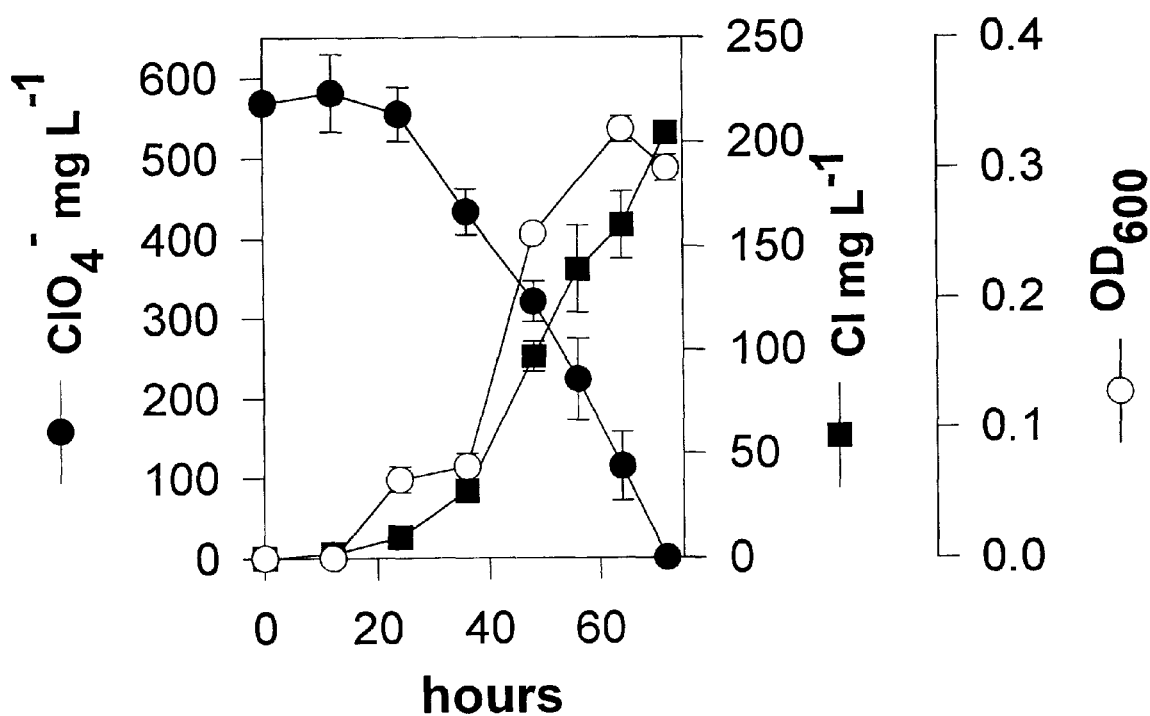
FIG. 1 depicts results of tests conducted to show production of chloride from perchlorate using perc1ace bacteria. Perchlorate reduction (●), chloride formation (■) and biomass (○). Each point represents the mean (± standard deviation) of 3 replicates.

The perchlorate-reducing isolate, perc1ace, is a gram-negative, curved rod, facultative anaerobe which can grow aerobically on acetate, and in the absence of oxygen, will reduce perchlorate and nitrate. Perclace is capable of growth on perchlorate between 0.1 and 1000 mg per liter, and can reduce perchlorate to levels <0.005 mg per liter. Identification of perc1ace was attempted using 16S-rRNA gene sequence homology (MIDI labs, Newark, Del.).

There was no similarity match strong enough to identify the isolate. Perclace had the highest sequence homology (between 90% and 92% similarity) with several members of the beta subclass of the Proteobacteria, indicating that perc1ace can be considered a member of the beta subclass.

Perclace joins three other bacteria known to reduce perchlorate (8, 21, 13) as well as two chlorate reducing bacteria (11, 16). Perclace shares some similarities to another beta-proteobacteria strain GR-1 isolated in Europe by Rikken et al. (13). Both are gram negative, rod-shaped, facultative anaerobes which can utilize simple organic acids, such as acetate, for the reduction of perchlorate and nitrate under anaerobic conditions. One distinguishing difference is that GR-1 was found to reduce Mn(IV) while perclace did not. The Perclace anaerobe was deposited with the American Type Culture Collection (Manassas, Va.) on Sep. 17, 1998 and given ATCC No. 202172.

The optimum environmental conditions for perchlorate reduction were investigated using batch studies. The rate of perchlorate reduction was examined over 5° C. intervals between 20 and 40° C. Perclace could reduce perchlorate between 20 and 40° C., with optimum activity between 25 and 30° C. Perchlorate reduction was also determined over a pH range between 5.5 to 8.5. Perclace was found to reduce perchlorate over a pH range between 6.5 and 8.5 with optimum activity being observed between 7.0 and 7.2.

The ability of perclace to utilize electron acceptors other than perchlorate under anaerobic growth conditions was investigated using acetate as the electron donor, and $NO_3^-$, Fe(III), Mn(IV), or $SO_4^{2-}$ as possible electron acceptors. Perclace was found to utilize perchlorate and nitrate only, and showed no capacity to reduce Fe(III), Mn(IV), and $SO_4^{2-}$.

Perclace can grow on acetate using three different electron acceptors, namely oxygen, nitrate and perchlorate. We investigated whether growth conditions could alter the ability of perclace to reduce perchlorate. Perclace was grown on acetate aerobically and anaerobically in the presence of nitrate or perchlorate. After one week the cells from each incubation treatment were washed in sterile water and then transferred into a perchlorate medium. We found that there was no difference in the rate of perchlorate reduction whether perclace had previously been grown aerobically, or anaerobically on nitrate compared to cells cultured on perchlorate (data not shown).

Denitrification by perclace was evaluated using bubble production, as described by Tiedje (17). A mineral salts media (35 mL) containing acetate (1000 mg $L^{-1}$) was transferred into 40 mL screw-cap vials. Triplicate vials received either nitrate (1000 mg $L^{-1}$ as $NaNO_3$) or nitrous oxide ($N_2O$). In the case of $N_2O$, the headspace of the vials was evacuated under vacuum and then replaced with $H_2O$ gas. The vials were then inoculated with perclace (1% v/v) and sealed air-tight. The vials contained an inverted glass tube to capture nitrogen gas bubbles formed by the reduction of nitrate and nitrous oxide. Within 3 days the media was turbid and gas bubbles had formed within the inner tube, which provides a presumptive positive for the production of nitrogen gas from the reduction of nitrate and nitrous oxide. As a control, a second set of vials contained perchlorate as the electron acceptor. Turbidity was also evident in the perchlorate vials, but no gas bubbles were formed.

A variety of carbon sources were examined to determine the range of compounds that could be utilized as electron donors in the promotion of perchlorate reduction (Table 1). Perclace utilized a variety of commercially available protein sources, including TSB (Difco, Detroit, Mich.) and nutrient broth (Difco), and could also utilize certain organic acids. Sugars and alcohols were not utilized.

TABLE 1

| Carbon source utilization | | |
|---|---|---|
| Carbon source | Perchlorate reduction | No perchlorate reduction |
| Carboxylic acids | Acetate<br>Fumarate<br>Propionate<br>Succinate | Citrate<br>Formate |
| Sugars | | Glucose<br>Lactose<br>Sucrose<br>Fructose<br>Starch |
| Protein sources | Casamino acids<br>Nutrient broth<br>Peptone<br>Tryptic Soy Broth<br>Yeast extract | |
| Alcohols | | Methanol<br>Ethanol |

The production of chloride from perchlorate reduction is shown in FIG. 1. Perclace reduced 580 mg per liter $ClO_4^-$ over a 72 hour period with the contaminant release of chloride, and the production of biomass, as indicated by an increase in optical density. After 72 hours, the amount of chloride produced represented between 97 and 105% of what had been added as perchlorate, indicating that perchlorate was completely transformed.

Figure 2:
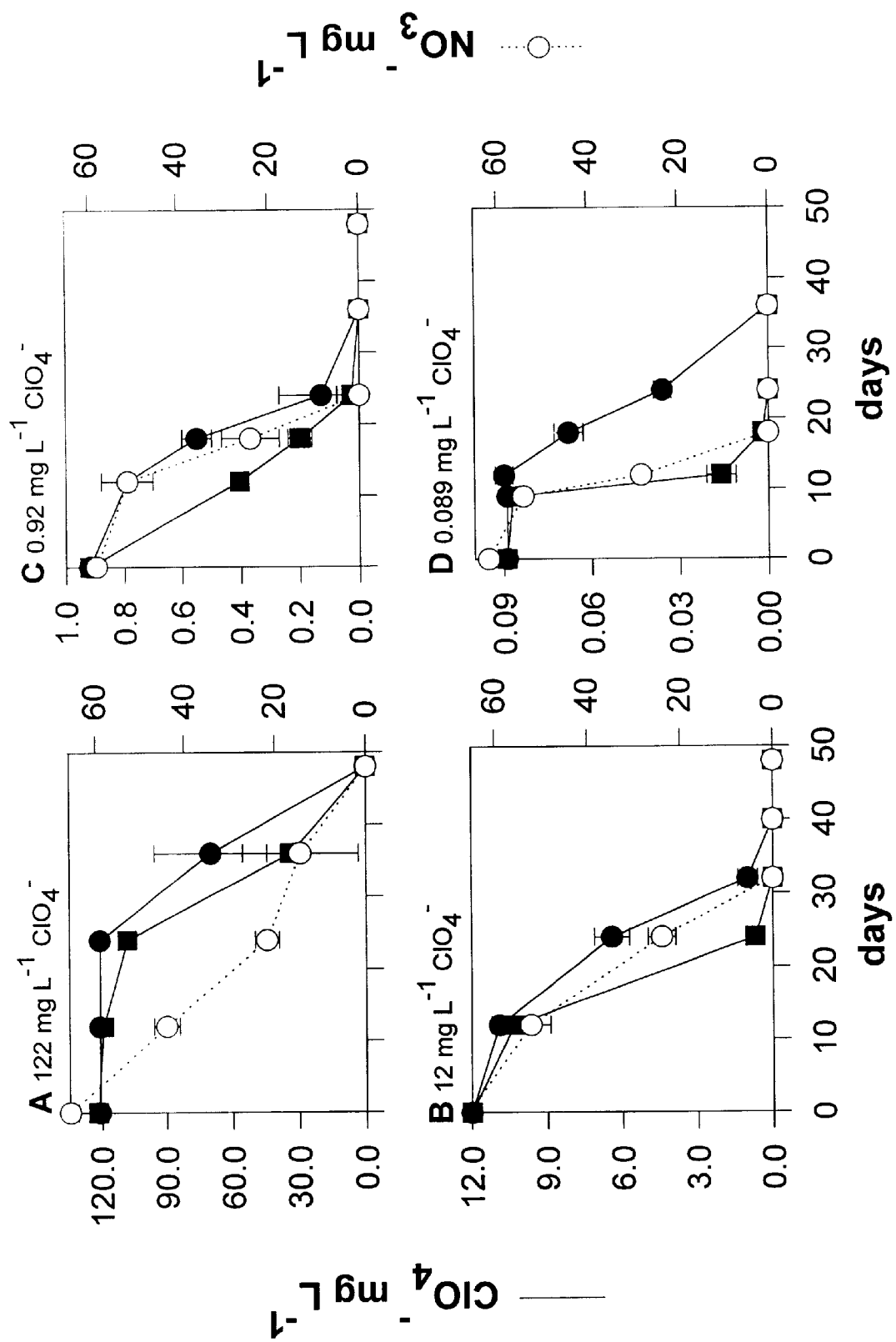
FIGS. 2A–2D depict results of tests conducted to show simultaneous reduction of perchlorate and nitrate by perc1ace bacteria. The figures compare perchlorate reduction with (●) and without (■) the presence of nitrate and also show nitrate reduction (○) for the treatments in which nitrate and perchlorate were both present. Each point represents the mean (± standard deviation) of 3 replicates

Perclace is capable of reducing both perchlorate and nitrate under similar growth conditions. FIG. 2 explores the effect of nitrate on perchlorate reduction by holding nitrate levels at 1 mM (62 mg per liter) and varying perchlorate between approximately 1 mM to 0.001 mM. With all treatment combinations it is evident that when perchlorate and nitrate are present together, nitrate was reduced at a faster rate than perchlorate. However, both nitrate and perchlorate were reduced within 48 hours. At almost equal molar concentrations of nitrate and perchlorate (FIG. 2A), there was little difference between perchlorate reduction in the presence or absence of nitrate. When perchlorate levels were reduced 10-, 100-, and 1000-fold compared to nitrate, the presence of nitrate did decrease the rate of perchlorate reduction, as compared to perchlorate reduction in the absence of nitrate. For example, the reduction of 0.089 mg per liter perchlorate reduction (FIG. 2D) to <0.005 mg per liter required less than 24 hours in the absence of nitrate but required 36 hours in the presence of 62 mg per liter of nitrate. It is interesting to note that perchlorate also affected the rate of nitrate reduction. At equal molar concentrations of nitrate and perchlorate (FIG. 2A), nitrate reduction required 48 hours. When the perchlorate concentration was reduced to 0.089 mg per liter (FIG. 2D), nitrate reduction required less than 24 hours. We also monitored for the presence of the nitrate reduction intermediate, nitrate ($NO_2^-$), and found that there was no detectable levels of $NO_2^-$ produced during $NO_3^-$ reduction.

It should be noted that the complete transformation of $ClO^-$ to $Cl^-$ was not affected by the presence of nitrate. Chloride production was monitored when 122 mg per liter perchlorate was reduced (FIG. 2A) and revealed the complete transformation of $ClO_4^-$ to $cl^-$ in the presence and absence of nitrate.

Figure 3:
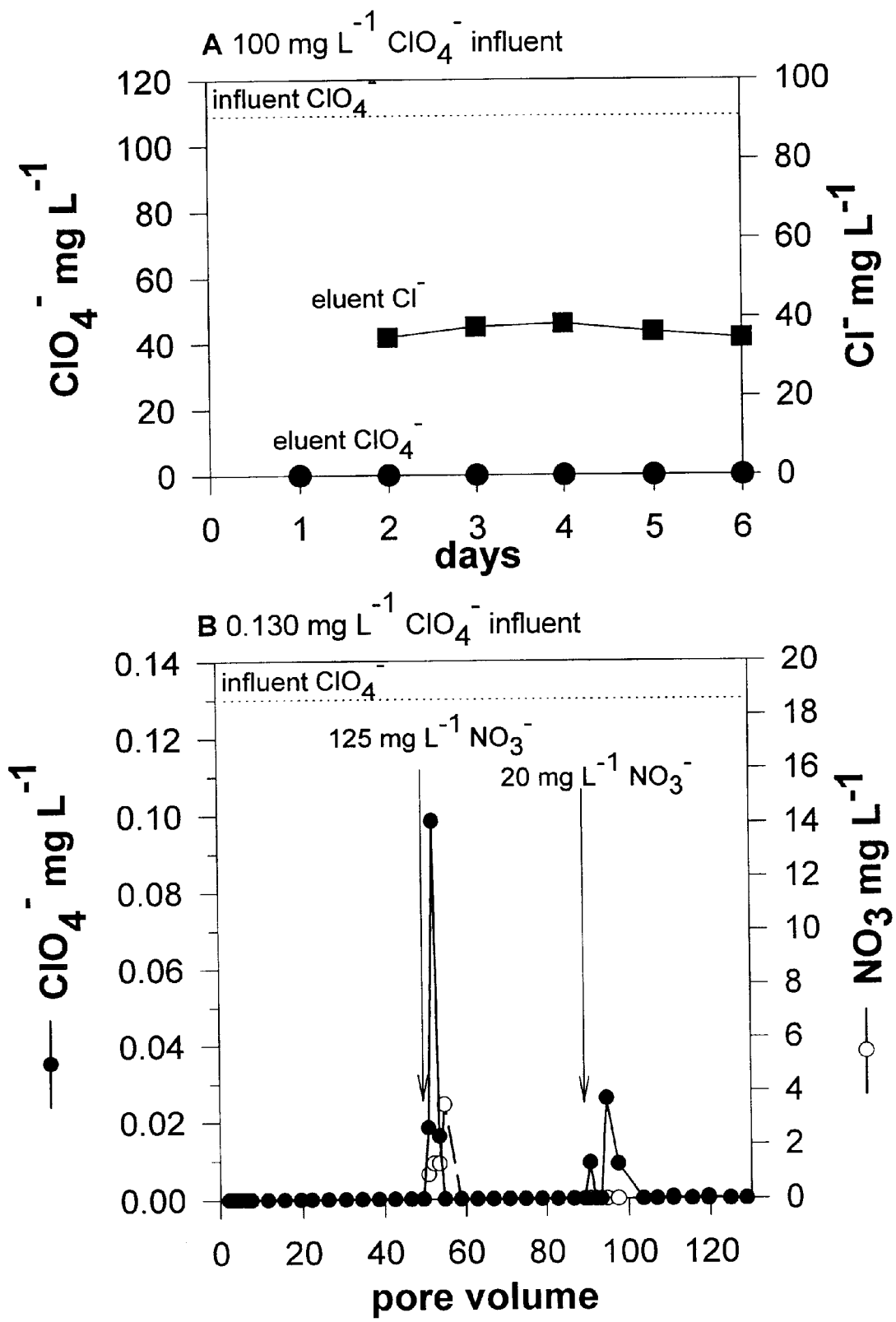
FIGS. 3A and 3B depict results of tests conducted to show simultaneous reduction of perchlorate and nitrate under saturated-flow conditions.

A column study was used to determine if the simultaneous reduction of perchlorate and nitrate would be maintained under saturated-flow conditions. The sand-packed column was first inoculated with perclace and then treated with a high perchlorate concentration to establish a perchlorate-reducing population. FIG. 3A shows that within one day, perchlorate concentrations were reduced from 100 mg per liter in the influent to <1 mg per liter in the eluent. Chloride determination within the eluent revealed complete transformation of perchlorate to chloride. The influent perchlorate concentration was then reduced to 0.130 mg per liter. After approximately 6 days (51 pore 25 volumes), 125 mg per liter nitrate was added to the influent for the next 40 pore volumes. Following the addition of nitrate, perchlorate levels in the eluent initially increased to 0.099 mg per liter. But within 5 pore volumes, perchlorate levels had declined to <0.005 mg per liter, and remained below detection for the next 35 pore volumes. Eluent nitrate concentration ranged from 1.0 to 3.5 mg per liter in the first 5 pore volumes, and then decreased to <0.5 mg per liter. Nitrite was detected in the eluent and ranged from 2 to 43 mg per liter for the first 16 pore volumes, and then was reduced to <0.5 mg per liter for the remainder of the study (data not shown). At pore volume 91, the nitrate level in the influent was reduced from 125 mg per liter to 20 mg per liter for the next 38 pore volumes. The reduction in nitrate level was followed by a period of perchlorate breakthrough. Perchlorate levels between 0.009 and 0.026 mg per liter were present in the eluent for 7 pore volumes, and then decreased to <0.005 mg per liter for the remaining 31 pore volumes. Although two samples (pore volumes 110 and 120) showed perchlorate levels of 0.0045 mg per liter. Nitrate and nitrite in the eluent remained <0.5 mg per liter.

The perc1ace bacteria may be used in place of any of the other bacteria which have been used to treat water and other materials to remove perchlorate and/or nitrate contaminants. For example, perc1ace can be used in the systems described in References 1–5, 8, 12–15, 19, 23. The term "biologically pure" when used herein refers to the perc1ace bacteria once it has been separated from its naturally occurring surroundings, i.e. sewage sludge. The perc1ace bacteria may be grown and cultured using conventional bacterial culture media which are well-known in the art. Exemplary growth media and conditions are as follows: perc1ace bacteria can be grown in a mineral salts media with acetate as the sole carbon source. The mineral salts media used contained $K_2HPO_4$ (225 mg $L^{-1}$), $KH_2PO_4$ (225 mg $L^{-1}$), $(NH_4)_2SO_4$ (225 mg $L^{-1}$), $MgSO_4 7H_2O$ (50 mg $L^{-1}$), $CaCO_3$ (5mg $L^{-1}$), $FeCl_2$ (5 mg $L^{-1}$), plus a mixture of trace metals. The acetate can be replaced with other organic acids, including fumarate, propionate and succinate, or the acetate can be replaced with protein sources, such as casamino acids, peptone or yeast extract. Perchlorate reduction requires the absence of oxygen, as well as moderate temperature (between 20 and 40° C.) and pH (between 6.5 and 8.5) conditions.

Perc1ace is especially well-suited for removing low levels perchlorate from water where the initial or first concentration of perchlorate is below about 1000 $\mu$g $L^{-1}$, but above 18 $\mu$g $L^{-1}$. When perc1ace is used to treat water having such relatively low contamination levels, the resulting treated water will have a final or second concentration of perchlorate which is below the mandated limit of 18 $\mu$g $L^{-1}$.

Details regarding the isolation and examination of perc1ace are as follows:

MATERIALS AND METHODS

Isolation of the perc1ace bacterium. Enrichment for a perchlorate reducing bacterial isolate began with the transfer of 10 mL of activated sewage sludge (Water Quality Control Plant, Riverside, Calif.) into a 125 mL Erlenmeyer flask containing 125 mL mineral salts medium with 1000 mg per liter acetate and 500 mg per liter perchlorate ($NaClO_4$, Aldrich, Milwaukee, Wis.). The headspace of the Erlenmeyer flasks were purged with nitrogen gas and sealed airtight with screw-cap stoppers. The mineral salts medium, FTW, modified from Losi and Frankenberger (9), contained $K_2HPO_4$ (225 mg per liter), $KH_2PO_4$ (225 mg per liter), $(NH_4)_2SO_4$ (225 mg per liter), $MgSO_4 7H_2O$ (50 mg per liter), $CaCO_3$ (5 mg per liter), $FeCl_2$ (5 mg per liter), plus a mixture of trace metals. Perchlorate levels within the flask were monitored using a perchlorate specific electrode (described below) and the loss of perchlorate was detected after more than 1 month. The perchlorate-reducing enrichment culture was then transferred to fresh medium, and has been maintained by monthly transfers to fresh medium. The perchlorate-reducing bacterium was isolated by selective plating using agar-hardened FTW containing 500 mg per liter perchlorate and 1000 mg per liter acetate. The plates were streaked with the perchlorate-reducing enrichment culture and incubated in a BBL GasPack anaerobic jar (Becton Dickinson, Cockeysville, Md.). After two weeks incubation, the dominant colony type was transferred twice more to fresh plates to ensure that a single species was isolated. The isolate was named perc1ace and was deposited with the American Type Culture Collection (ATCC) on Sep. 17, 1998 as deposit No. 202172.

The ability of perc1ace to utilize a variety of electron acceptors other than perchlorate was examined. With acetate as the electron donor, growth of the bacteria under anaerobic conditions was determined in 125 mL of FTW containing 1000 mg per liter acetate with $NO_3^-$, Fe(III), Mn(IV), or $SO_4^{2-}$ as electron acceptors, and a 1% (v/v) inoculum of perchlorate-grown perc1ace. Five mM of $NO_3^-$ (as $NaNO_3$) or $SO_4^{2-}$ (as $Na_2SO_4$) were used. The Fe(III) and Mn(IV) were prepared as oxide slurries following the procedures outlined by Ghiorse (6), and 5 mM suspensions in FTW were prepared based on the dry weight of the slurries assuming that Fe(III) or Mn(I) were dominant. The ability of the bacteria to utilize each electron acceptor was evaluated by biomass production (turbidity) as well as color change indicators. $SO^{2-}$ reduction was indicated by the formation of a black precipitate due to a reaction of sulfide with the iron in FTW. Iron reduction was indicated by the conversion of red-brown Fe(III) oxide to a black precipitate, while the reduction of dark brown Mn(IV) formed a white precipitate. Nitrate loss was determined by ion chromatography, as described below.

Perchlorate, nitrate, nitrite, and chloride analysis. Perchlorate concentrations were determined using an ion selective probe (model 93-81, Orion Research, Boston, Mass.) for perchlorate concentrations between 1 and 1000 mg per liter. Detection of perchlorate to 0.005 mg per liter was performed by ion chromatography (IC) (Dionex, Sunnyvale, Calif.). Initially an IonPac AS5 column was used, but we later switched to an LonPac AS11 column and followed the method described in Dionex application note #121 and by Wirt et al. (22). We used a 100 mM NaOH eluent at a flow rate of 1 mL per minute with conductivity detection. Eluent suppression was performed using ASRS-II (4 mm) operated at 300 mA with water as the regenerate (10 mL per minute). The sampling loop was 0.740 mL.

Nitrate and nitrite concentration to <0.5 mg per liter were determined by ion chromatography using an IonPac AS14 column following the standard procedure provided by Dionex. Chloride was determined using a HBI digital chloridometer.

Perchlorate-reduction batch studies. Batch studies were performed using 50 mL Erlenmeyer flasks sealed with rubber stoppers (size #2). The flasks contained 50 mL of FTW with 1000 mg per liter acetate and the appropriate amount of perchlorate, depending on the study. The inoculum was prepared by washing perchlorate grown perc1ace in sterile water and then adding 1% (v/v) aliquot.

A batch study was used to demonstrate perchlorate reduction, chloride formation, and biomass production for perc1ace. The formation of chloride and the production of biomass from the reduction of 580 mg per liter perchlorate was monitored after 12, 24, 36, 48, 56, 65, and 72 hours. A high concentration of perchlorate was used such that chloride formation could be detected above background levels. At each sampling time, 3 flasks were sacrificed, and samples for perchlorate and chloride determination were centrifuged and then filtered (Supor-450 membranes, 0.45 $\mu$M, Gelman Sciences, Ann Arbor, Mich.). Perchlorate loss and chloride formation were monitored using the Orion electrode and the chloridometer, respectively, while biomass production was determined by an increase in optical density ($OD_{600}$).

Groundwater contaminated with perchlorate often contains appreciable amounts of nitrate. The effect of nitrate on perchlorate reduction by perc1ace was examined in a series of batch experiments in which the $NO_3^-$ concentration was maintained at 62 mg per liter (1.0 mM, added as $NaNO_3$) while $ClO_4^-$ levels were 122, 12.0, 0.92, and 0.089 mg per liter (1.2, 0.12, 0.01, and 0.001 mM). Perchlorate reduction was monitored in the presence and absence of nitrate, with samples usually taken every 12 hours over a 48 hour period. The perchlorate and/or nitrate in 50 mL of FTW with 1000 mg per liter acetate and 1% (v/v) inoculum of perchlorate-grown perc1ace was incubated in 50 mL Erlenmeyer flasks sealed with rubber stoppers. In the experiments with perchlorate at 122 and 12.0 mg per liter, perchlorate removal to <1 mg per liter was monitored using the perchlorate selective electrode. Ion chromatography was used to monitor the loss of perchlorate in the remaining experiments. In the case of 0.92% mg per liter perchlorate, the FTW medium was found to interfere with perchlorate analysis and limited the detection of perchlorate to 0.1 mg per liter. In the case of 0.089 mg per liter perchlorate, a change was made to a less concentrated mineral salts formulation. The new mineral salts medium, referred to as BMS, was composed of $NaH_2PO_4 \cdot H_2O$ (36 mg per liter), $Na_2HPO_4$ (104 mg per liter), $NH_4Cl$ (60 mg per liter), $MgSO_4 \cdot 7H_2O$ (10 mg per liter), $CaCl_2 \cdot 2H_2O$ (10 mg per liter), and $FeCl_2 \cdot 4H_2O$ (2 mg per liter). This formulation provided nutrients essential to maintaining perchlorate reduction but interfered less with perchlorate detection, and perchlorate loss could be detected to 0.005 mg per liter. Perchlorate and/or nitrate in BMS (40 mL) with 300 mg per liter acetate was incubated in 40 mL EPA vials (Fisher Scientific) sealed with teflon-lined screw-caps.

Perchlorate-reduction column study. A glass column (2.8 cm internal diameter and 14 cm length) packed with sterilized, oven-dried sand (Type #30, Ogleby Norton Industrial Sands, San Juan Capistrano, Calif., 40–70 mesh size was used). The pore volume within the column was 36 mL, and a 3 hour retention time was maintained using a 0.2 mL per minute flow rate (model P-3 peristaltic pump, Pharmacia, Piscataway, N.J.). The column was saturated for 5 days from the bottom-up with a 5 mM NaCl solution, and then inoculated by loading the column for 24 hours with a suspension of perc1ace. The cell suspension was prepared using perchlorate-grown cells washed and suspended in sterile FTW to a final optical density ($OD_{600}$) of 0.05. The column was then loaded with a solution of 100 mg per liter perchlorate and 1000 mg per liter acetate in FTW for 6 days. The high perchlorate influent was used to establish a viable and active perchlorate-reducing population within the column. Perchlorate concentration in the influent and eluent were determined daily using the perchlorate specific electrode, and the transformation of perchlorate was determined by monitoring chloride levels in the eluent. Following the establishment of a perchlorate-reducing population, the column study then proceeded in two stages. The objective of the first stage was to show perchlorate reduction using a level of perchlorate representative of contaminated groundwater. The column was loaded with 0.130 mg per liter perchlorate and 300 mg per liter acetate in BMS medium for 6 days. The influent medium had been autoclaved, and was purged constantly under a nitrogen stream in order to maintain low oxygen concentrations. In the second stage of the column study, nitrate was added to the influent in order to determine if perc1ace could maintain perchlorate reduction in the presence of an alternate electron acceptor. Two different levels of nitrate were used to represent groundwater contaminated with a relatively high level of nitrate (125 mg per liter) and a more moderate level of nitrate (20 mg per liter). The column influent was 0.130 mg per liter perchlorate with 300 mg per liter acetate plus 125 mg per liter nitrate for five days, followed by 20 mg per liter nitrate for five days. The column eluent was collected using a fraction collector, and selected fractions were filtered and then analyzed for perchlorate and nitrate using ion chromatography.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

BIBLIOGRAPHY

1. Attaway, H., and M. Smith. 1993. Reduction of perchlorate by an anaerobic enrichment culture. *J. Ind. Microbiol.* 12:408–412.
2. Attaway, H., and M. Smith. 1994. Propellant wastewater treatment process. U.S. Pat. No. 5,302,285.
3. Chen, S-D., C.-Y. Chen, Y.-C. Shen, C.-M. Chiu and H.-J. Cheng. 1996. Treatment of high-strength nitrate wastewater by biological methods operational characteristics study. *Wat. Sci. Tech* 34:269–276.
4. Csikor, Zs., L. Czakó, P. Miháltz, and J. Holló. 1996. Complete nitrogen removal from waste and drinking water in a fluidized-bed reactor. *Food Science and Technology International* 2:165–171.
5. Gayle, B. P., G. D. Boardman, J. H. Sherrard, and R. E. Benoit. 1989. Biological denitrification of water. *J. Environ. Engineering* 115:930–943.
6. Ghiorse, W. C. 1994. Iron and manganese oxidation and reduction In Methods of Soil Analysis, Part 2—Microbiological and Biochemical Properties. *Soil Science Society of America, Book Series* 5. SSSA, Madison, Wis. pp. 1079–1096.
7. Herman, D. C., and W. T. Frankenberger, Jr. 1998. Microbial-mediated reduction of perchlorate in groundwater. *J. Environ. Qual.* 27:750–754.
8. Korenkov, V. N., V. I. Romanenko, S. I. Kuznetsov, and J. J. V. Voronov. 1976. Process for purification of industrial waste waters from perchlorates and chlorates. U.S. Pat. No. 3,943,055.

9. Losi, M. E., and W. T. Frankenberger, Jr. 1997. Reduction of selenium oxyanions by Enterobacter cloacae SLD1a—a: isolation and growth of the bacterium and its expulsion of selenium particles. *Appl. Environ. Microb.* 63:3079–3084.

10. Malmqvist, A., T. Welander, and L. Gunnarsson. 1991. Anaerobic growth of microorganisms with chlorate as an electron acceptor. *Appl. Environ. Microbiol.* 57:2229–2232.

11. Malmqvist, A., T. Welander, E. Moore, A. Ternstrom, G. Molin, and I.-M. Stenstrom. 1994. Ideonella dechloratans gen. nov., sp. nov., a new bacterium capable of growing anaerobically with chlorate as an electron acceptor. *System. Appl. Microbiol.* 17:58–64.

12. Mateju, V., S. Cizinska, J. Krejci, and T. Janoch. 1992. Biological water denitrification—a review. *Enzyme Microbiol. Technol.* 14:170–183.

13. Rikken, G. B., A. G. M. Kroon, C. G. van Ginkel. 1996. Transformation of (per)chlorate into chloride by a newly isolated bacterium: reduction and dismutation. *Appl. Microbiol. Biotechnol.* 45:420–426.

14. Romanenko, V. I., V. N. Korenkov, and S. I. Kuznetsov. 1976. Bacterial decomposition of ammonium perchlorate. *Mikrobiologiya* 45:204–209.

15. Semon, J., T. Sadick, D. Palumbo, M. Santoro, and P. Keenan. 1997. Biological upflow fluidized bed denitrification reactor demonstration project—Stamford, Conn., USA. *Wat. Sci. Tech.* 36:139–146.

16. Stepanyuk, V. V., Smirnova, G. F., Klyushnikova, T. M., Kanyuk, N. I., Panchenko, L. P., Nogina, T. M., and Prima, V. I., 1992. New species of the Acinetobacter genus, *Acinetobacter thermotoleranticus* sp. Nov. *Mikrobiologiya* 61:347–356.

17. Tiedje, J. M. 1994. Denitrifiers. In Methods of Soil Analysis, Part 2—Microbiological and Biochemical Properties. *Soil Science Society of America*, Book Series 5. SSSA, Madison, Wis. pp. 245–267.

18. van Ginkel, C. G., G. B. Rikken, A. G. M. Kroon, and S. W. M. Kengen. 1996. Purification and characterization of chlorite dismutase: a novel oxygen-generating enzyme. *Arch Microbiol.* 166:321–326.

19. Wallace, W., S. Beschear, D. Williams, S. Hospadar, and M. Owens. 1998. Perchlorate reduction by a mixed culture in an up-flow anaerobic fixed bed reactor. *J. Ind. Microbiol. Bioteck.* 20:126–131.

20. Wallace, W., S. Beschear, S. Wyatt, and S. Baxley. 1995. Purification of the chlorite reductase from *Wolinella succinogenes* HAP-1, Abstract O-53-, p. 377. In Abstracts of the 95th General Meeting of the American Society for Microbiology, American Society for Microbiology, Washington, D.C.

21. Wallace, W., T. Ward, A. Breen, and H. Attaway. 1996. Identification of an anaerobic bacterium which reduces perchlorate and chlorate as *Wolinella succinogenes*. *J. Ind. Microbiol.* 16:68–72.

22. Wirt, K., M. Laikhtman, J. Rohrer, P. E. Jackson. 1998. Low-level perchlorate analysis in drinking water and ground water by ion chromatography. *American Environmental Laboratory* 10(3):4–5.

23. Yakovlev, S. V., J. V. Voronov, V. N. Korenkov, A. B. Nevsky, V. A. Bobrikova, T. A. Karjurkhina, I. N. Churbanova, and J. M. Laskov, J. M. 1973. Method for biochemical treatment of industrial waste water. U.S. Pat. No. 3,755,156.

What is claimed is:

1. A method for removing perchlorate from water, said method comprising the step of contacting water comprising perchlorate at a first concentration with a bacteria under anaerobic conditions for a sufficient time to remove perchlorate from said water to thereby provide water comprising a second concentration of perchlorate which is lower than said first concentration of perchlorate, wherein said bacteria is identified as perc1ace bacteria which is deposited at the American Type Culture Collection under ATCC No. 202172.

2. A method for removing perchlorate from water according to claim 1 wherein said first concentration of perchlorate is below about 1,000 and above 18 parts per billion.

3. A method for removing perchlorate from water according to claim 1 wherein said second concentration of perchlorate is below 18 part per billion.

4. A method for removing perchlorate from water according to claim 1 wherein the pH of said water is between about 7.0 and 7.2.

5. A method for removing perchlorate from water according to claim 1 wherein said anaerobic conditions comprise a carbon source selected from the group consisting of organic acids and proteins.

6. A method for removing perchlorate from water according to claim 1 wherein said water further comprises nitrate at a first concentration and wherein said perc1ace bacteria is contacted with said water under anaerobic conditions for a sufficient time to remove nitrate from said water to thereby provide water comprising a second concentration of nitrate which is lower than said first concentration of nitrate.

7. A method for removing perchlorate from water according to claim 1 which includes the additional step of separating said perc1ace bacteria from the water having said second concentration of perchlorate.

8. In a method for removing perchlorate from a material which is contaminated with perchlorate, said method comprising the step of treating said material with a bacteria under anaerobic conditions to remove said perchlorate, the improvement comprising using a bacteria that is identified as perc1ace, which is deposited at the American Tyne Culture Collection under ATCC No. 202172, as the bacteria in said treatment.

9. An improved method according to claim 8 wherein said material is water that is contaminated with perchlorate which is present at a first concentration.

10. An improved method according to claim 9 wherein said water has a pH of between about 7.0 and 7.2.

11. An improved method according to claim 9 wherein said first concentration of perchlorate is below about 1,000 and above 18 parts per billion.

12. An improved method according to claim 8 wherein said material is also contaminated with nitrate.

13. A biologically pure composition comprising a bacteria that is identified as perc1ace which is deposited at the American Type Culture Collection under ATCC No. 202172.

14. A biologically pure composition according to claim 13 which further comprises growth media for said perc1ace bacteria.

15. A composition for use in treating contaminated material under anaerobic conditions to remove perchlorate and/or nitrate therefrom, said composition comprising a bacteria that is identified as perc1ace which is deposited at the American Type Culture Collection under ATCC No. 202172, growth media for said perc1ace bacteria and a carbon source selected from the group consisting of organic acids and proteins.

16. A system wherein perchlorate contaminants are removed from water, said system comprising water which is contaminated with perchlorate, a bacteria that is identified as perclace which is deposited at the American Type Culture Collection under ATCC No. 202172, growth media for said perclace bacteria and a carbon source selected from the group consisting of organic acids and proteins.

17. A system according to claim 16 wherein said water has a pH of between about 7.0 and 7.2.

18. A system according to claim 17 wherein the temperature of said water is between about 25° C. and about 30° C.

* * * * *